J. B. BARTHOLOMEW.
GANG PLOW.
APPLICATION FILED JAN. 23, 1911. RENEWED MAY 12, 1919.
1,331,044.
Patented Feb. 17, 1920.
3 SHEETS—SHEET 1.
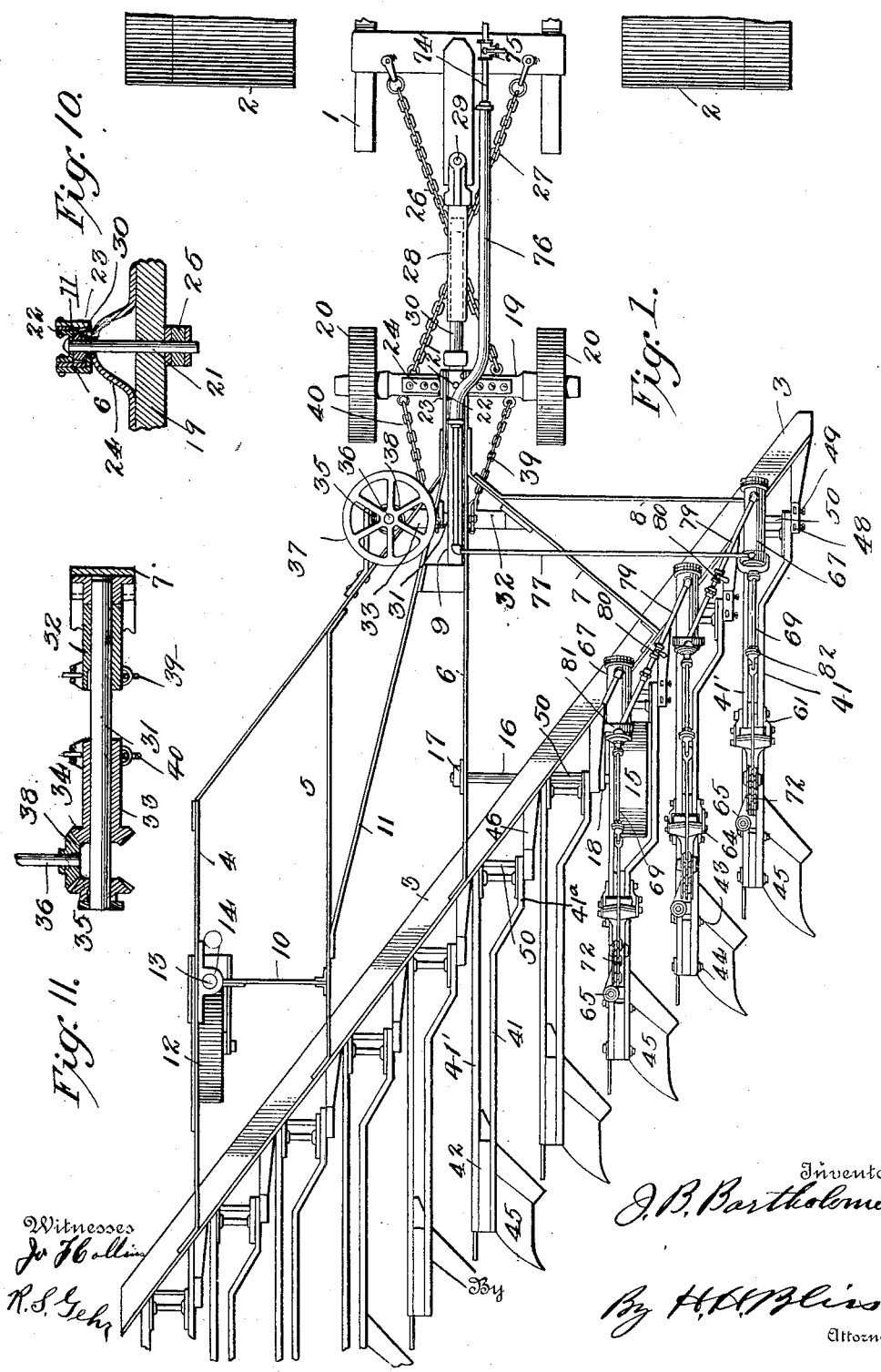

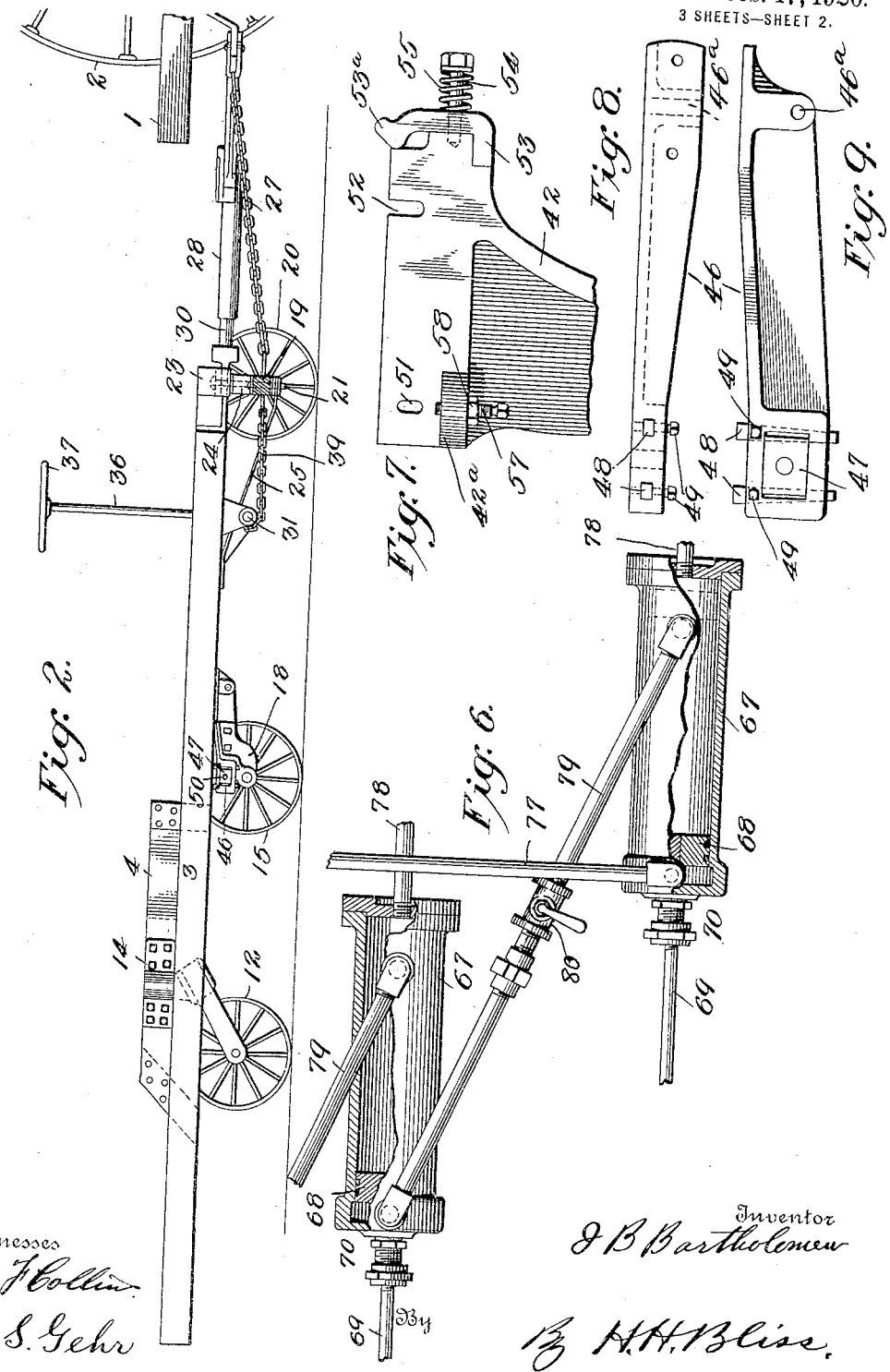

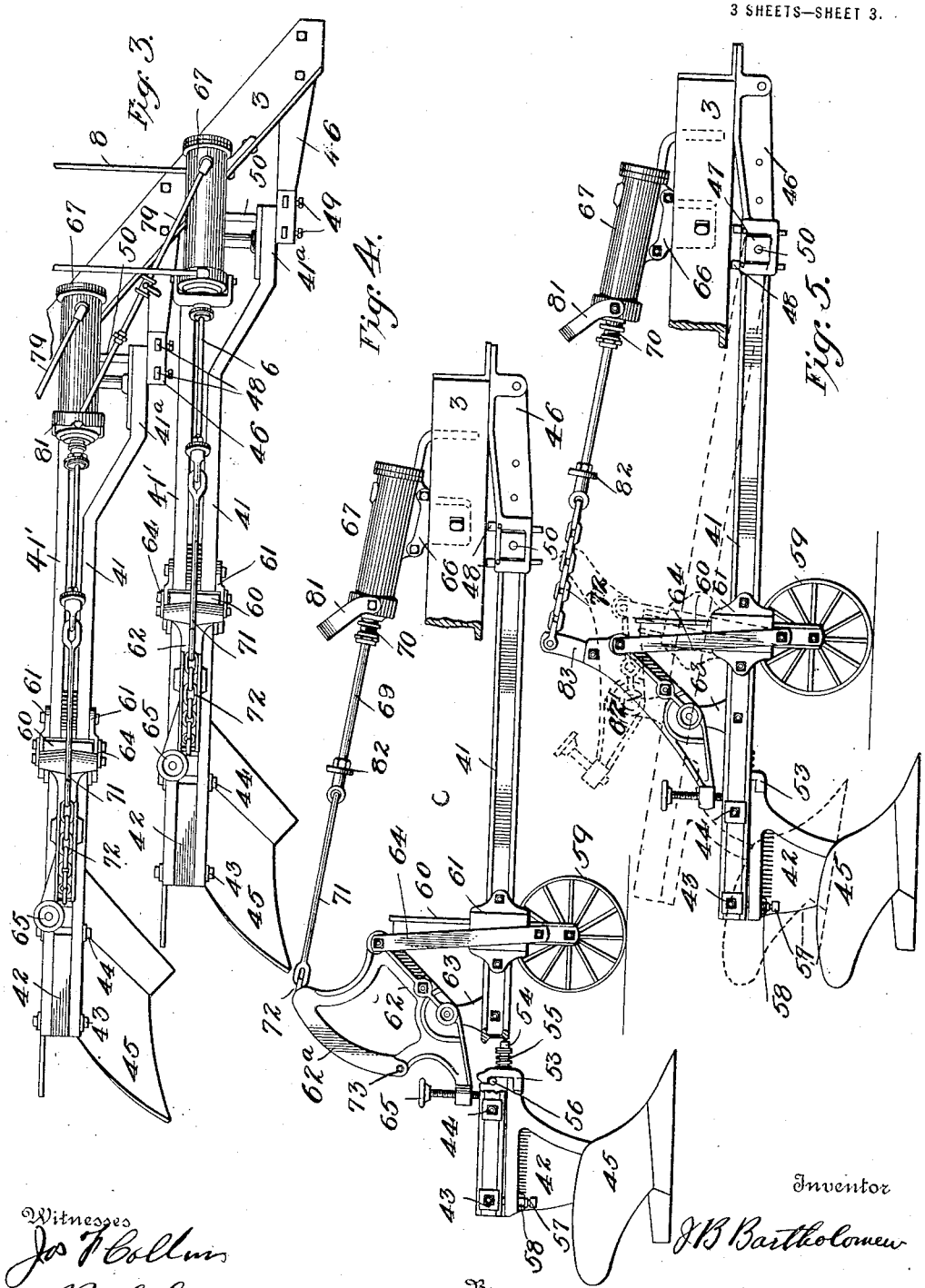

UNITED STATES PATENT OFFICE.

JOHN B. BARTHOLOMEW, OF PEORIA, ILLINOIS, ASSIGNOR TO AVERY COMPANY, A CORPORATION OF ILLINOIS.

GANG-PLOW.

1,331,044.  Specification of Letters Patent.  Patented Feb. 17, 1920.

Application filed January 23, 1911, Serial No. 604,229. Renewed May 12, 1919. Serial No. 296,546.

*To all whom it may concern:*

Be it known that I, JOHN B. BARTHOLOMEW, a citizen of the United States, residing at Peoria, in the county of Peoria and State of Illinois, have invented certain new and useful Improvements in Gang-Plows, of which the following is a specification, reference being had therein to the accompanying drawing.

This invention relates to gang plows, that is to plows which comprise a main frame adapted to be connected to a suitable tractor, and a series of individual plows coupled side by side to the main frame.

The principal object of the invention is the provision in a machine of this character of novel devices adapted to lift the individual plows in succession. As it is necessary to arrange the plows in an oblique line so that the soil from one plow can be thrown into the furrow of the adjacent plow without interference, it results, if the plows are lifted simultaneously at the ends of the furrows and are similarly lowered after turning, that the furrows do not end in the same transverse line, and the plowing at the side of the field is therefore uneven. It has been proposed heretofore to provide power mechanism operated from the ground wheels of the plow or tractor and adapted to lift the plows in succession. This invention contemplates the provision of a series of individual motors or motive devices, each mechanically independent of the others, for lifting the individual plows, in connection with means for automatically controlling the operation of said motors, to effect their successive operation so as to lift the several plows and also to lower them one after another in the desired manner.

I have herein shown the several motors connected, respectively, to ground wheels which support the respective units, the motors serving to move the ground wheels relatively downward, thus lifting the units. I do not, however, herein claim the lifting of plowing units either singly or successively by means of power applied to the supporting wheels. These features are covered by my co-pending application, Serial No. 594,727, gang plows, filed November 29, 1910, and my co-pending application, Serial No. 707,255, filed July 2nd, 1912.

The foregoing and other more or less incidental features of the invention will be clear from the following description.

In the accompanying drawings—

Figure 1 is a plan view of a machine embodying my improvements in their preferred form.

Fig. 2 is a side elevation of the main frame of the plow with one of the front ground wheels omitted to better show some of the features of the construction.

Fig. 3 is an enlarged plan view of two of the individual plows and a portion of the main frame to which they are connected.

Fig. 4 is a side elevation of one of the plows shown in Fig. 3 with a portion of the plow beam broken away to show details of construction.

Fig. 5 is a side elevation similar to that of Fig. 4, but showing a modified construction.

Fig. 6 is a diagrammatic plan view of two of the plow lifting cylinders with their pipe connections.

Fig. 7 is a detail view of the upper part of one of the plow standards.

Fig. 8 is a top view, and

Fig. 9 is a side view of one of the coupling arms or brackets by which the individual plows are secured to the main frame.

Fig. 10 is a detail transverse sectional view showing the manner of coupling the front ground wheels to the main frame.

Fig. 11 is a vertical section through a portion of the steering gear.

Referring in detail to the construction illustrated, 1 designates the rear part of the frame of a traction engine, and 2, 2 the drive wheels thereof. My improved plow is, in some respects, useful with any form of tractor, but in other respects, as will presently appear, is designed especially for use in connection with a steam tractor.

The main frame consists of an obliquely disposed beam 3, preferably in the form of an angle bar, and a number of bars 4, 5, 6, 7, 8 which are rigidly connected to the beam 3, and which converge or extend toward a central point in front of the beam where they are connected to each other or to a short horizontally disposed beam 9. Additional brace bars 10 and 11 are also preferably provided. All of these bars are made of plain flat stock, and while comparatively light in weight, are so disposed and connected as to form a very strong and rigid frame well designed to sustain stresses to which it is subjected in operation.

The main frame is supported from the ground by several wheels comprising a caster wheel 12, the spindle 13 of which is mounted in a bearing 14 secured to the frame bars 4 and 10 at a point in front of the beam 3. A second ground wheel 15 is disposed to the rear of the beam 3 and at the other side of the frame, being mounted upon a shaft or axle 16 which is supported at one end by a bracket 17 on the bar 6 and at its other end by a bracket 18 which is preferably carried by one of the plow coupling brackets as shown in Fig. 2.

The wheels 12 and 15 serve to support the rear parts of the main frame; the front part of the frame is carried by a truck comprising an axle 19 and wheels 20, 20. This truck is connected to the main frame at the front end of the beam 9 by means of a king bolt 21. The preferred form of the construction is indicated in Fig. 10. The frame bars 11 and 6 are extended somewhat beyond the front end of the beam 9 and to the extended ends of these bars are secured the U-shaped plates 22 and 23, these plates being perforated to receive the king bolt 21. The axle 19 has on its upper side an arched plate 24 upon which the stem-like part of the frame rests. The construction is such as to permit a limited rocking movement between the truck axle and the frame. 25 is a brace bar extending from the rear part of the beam 9 downward to the lower end of the king bolt 21.

The frame is connected to the tractor by means of crossed chains 26, 27, the rear ends of which are secured to the axle 19, and the front ends of which are secured to the frame 1 of the tractor. By adjusting the lengths of these crossed chains in relation to each other, the position of the plow frame in relation to the longitudinal axis of the tractor can be varied as desired within certain limits. It is desirable in many cases to adjust the chains so that the center line of the plow frame will take a position to the right of the axis of the center line of the engine, and thus keep the right driving wheel of the engine far enough from the furrow so that it will not break the furrow down and cause slippage of the wheels.

With a chain coupling it is not possible, of course, to back the plow by means of the engine. To make this possible and still retain the advantages of the chain, I provide in addition thereto a backing strut or pole which consists of a front tubular part 28 which is pivoted at 29 to the engine frame, and a rear part 30 which telescopes within the part 28 and is secured at its rear end to the king bolt 21. With this construction, it will be seen that the action of the chains is not interfered with while they are under tension and, at the same time, the parts 28 and 30 when closed together somewhat constitute a strut or pole by means of which the plow frame can readily be backed by backing the engine.

In backing the machine, it is desirable to be able to steer it and for this purpose I provide suitable means for swinging the axle 19. A shaft 31 is rotatably mounted in bearing brackets depending from the main frame. To the right end of this shaft is secured a sleeve 32, and to the left of this sleeve is rotatably mounted a second sleeve 33. A bevel pinion 34 is secured to the sleeve 33 and a bevel pinion 35 is secured to the left end of the shaft 31. 36 is an upright steering post having a suitable hand wheel 37 at its upper end, and at its lower end a bevel pinion or gear 38 which meshes with the pinions 34 and 35. A chain 39 has its rear end secured to the sleeve 32 and its front end to the axle 19, and a similar chain 40 has its rear end secured to the sleeve 33 and its front end to the axle. It will be seen that when the hand wheel 37 is turned, the sleeves 32 and 33 are turned in opposite directions so that one of the chains 39, 40 is wound up as the other is paid out, thus causing the axle 19 to swing in one direction or the other at will.

I do not claim as a part of my present invention the construction which I have shown for connecting the plow with the tractor, nor do I claim this connecting construction in combination with the manually controllable steering wheels. These features are covered by my co-pending application for gang plows, Serial No. 296,240, filed May 10, 1919, as a division of this application.

The plows are flexibly connected to the obliquely disposed beam 3. The machine as shown is designed with nine individual plows. Each of the individual plows comprises a beam part formed by two parallel bars 41, 41' which at their rear ends are spaced far enough apart to receive the upper end of the plow shank or standard 42, said standard being clamped in position by bolts 43, 44. A plow body 45 of any suitable form is mounted upon the standard.

The beam bar 41 at its forward end is bent laterally as shown in the plan views so that its front end 41ª is spaced from the front end of the bar 41′ farther than the rear ends of said bars are spaced from each other. This is done to give the plow beam a laterally extended pivotal connection with the main frame. Such connection is provided by mounting on the beam 3 of the frame a series of rearwardly extending bracket arms 46, which are spaced uniformly from each other as indicated in Fig. 1. Each of these bracket arms is formed at its front end with a transverse bearing aperture 46ª and at its rear end is slotted to receive an adjustable bearing block 47. This block is held adjustably in position by means of tapered pins 48 and set screws 49 which engage said pins. By adjusting the pins up and down, the bearing block 47 can be adjusted forward or backward. The length of the bracket arms 46 is such that the bearing aperture in the block 47 of one arm is disposed directly opposite the bearing aperture 46ª of the next adjacent arm on the left. In these adjacent bearing apertures is mounted a pivot pin 50 and to this pin are pivotally connected the front ends of the beam bars 41, 41′. With the series of plows coupled in this manner to the main frame, it will be seen that the rear end of each plow beam can be swung or adjusted laterally in either direction by adjusting bearing block 47 forward or backward. In this way the uniform spacing of the plows is secured which is necessary to secure furrows of uniform width.

In a separate co-pending application for gang plows, Serial No. 707,256, filed July 2nd, 1912, I have shown and claimed a coupling construction similar to that herein disclosed, i. e., one comprising a series of longitudinally disposed bracket arms and means for pivotally connecting one side of each beam to the rear of one bracket and for adjustably and pivotally connecting the other side of the beam to the forward end of another bracket.

The standard of each plow is secured adjustably and yieldably to its beam. Referring to Fig. 7, it will be observed that an elongated aperture 51 is provided to receive the clamping bolt 43 while an open ended slot 52 is provided to receive the bolt 44. It will be seen that the slot 52 is arranged so that the plow standard might swing downward and rearward around the bolt 43. Such swinging of the standard is normally prevented to a certain extent by the clamping pressure of the bolts 43, 44, but more especially by the clamp 53. This clamp slidably engages the front part of the plow standard and also the screw bolt 54 upon which it is mounted. A stiff coil spring 55 is interposed between the clamp and the head of the bolt 54. The upper end of the clamp has a rearward extending lip or hook 53ª which normally fits over a cross bolt or bar 56 which is carried by the plow beam bars 41, 41′.

The construction is such that any normal resistance to the plow body 45 is insufficient to disengage the clamp 53 from the cross bolt 56. But in case the plow encounters an obstruction that would subject the plow to stresses great enough to cause breakage, the clamp 53 will be forced forward against the pressure of spring 55 and the plow body and its standard will then be free to swing rearward about the bolt 43. In this manner obstructions are passed without danger of breaking the plows. Of course, when one of the plows has been released and has swung backward, it is necessary after passing the obstruction to replace the plow in its normal position.

The aperture 51 for the bolt 43 is elongated as shown to permit the plow standard to be adjusted about the axis of the cross bolt 56. To hold the standard in adjusted position, it is formed with a laterally extending lug or ear 42ª in which is mounted a screw 57 having a lock nut 58. The upper end of this screw is arranged to engage the under side of the beam bar 41. By means of this adjusting feature, the plow body can have its point adjusted up or down as will readily be understood.

I do not herein claim the mechanism which I have shown for connecting the plow standard to the plow beam as this is covered by my co-pending application for plows, Serial No. 670,228, filed January 9, 1912, as a division of this application.

Each of the individual plows is provided with a ground wheel 59 which serves both to gage the depth of the furrow and also to effect the lifting of the plow. The wheel is mounted upon the lower end of the upright standard 60 which is mounted slidably between the beam bar 41 and a guide 61 secured thereto. 62 is a lever pivotally mounted on a bearing bracket 63 of the plow beam, and 64 is a link connecting the front end of this lever to the lower portion of the wheel standard 60. The rear end of the lever 62 carries a hand screw 65 which is arranged to contact with the upper side of one of the beam bars and thus serves to limit the downward swing of the rear end of the lever 62 and consequently the upward movement of the ground wheel 59. By adjusting the screw 65, the plow can be gaged to cut at different depths.

A series of motive devices are provided, one for each plow unit. These motive devices are mechanically independent of each other. As concerns the exact form of the motive devices there can be wide variation within the scope of the invention. Motive devices of one form are shown in the drawings for the purpose of illustrating one way in which the invention can be embodied. In front of each plow is a bracket 66 mounted on the frame beam 3 and to this bracket is bolted a steam cylinder 67. In the cylinder is a piston 68 which is secured to a piston rod 69 that extends through a suitable stuffing box 70 in the front head of the cylinder. The cylinders 67, the pistons 68, and the piston rods 69, together with the steam supply pipes to be described, constitute motive devices such as are above referred to. The rear end of the piston rod is connected by means of a link 71 to a chain 72 which in turn is secured at 73 to the lever 62. This lever is formed with a segment arm 62$^a$ which is grooved to receive the chain 72. It is clear that if the piston 68 is moved forward in the cylinder 67, said movement will be transmitted by the piston rod 69, the link 71 and the chain 72 to the lever 62 causing the front end of said lever to be swung downward and forward relative to the plow beam upon which it is mounted. As said lever is connected by means of the link 64 to the wheel standard 60, it follows that such swinging of the lever will cause a lifting of the plow beam on the standard 60. As the cylinder 67 is rigidly mounted on the engine frame, it is desirable that the line of draft between the piston and the chain 72 should remain fixed so that the piston rod will not be subjected to binding stresses. To this end the guide 62$^a$ is so shaped, account being taken of the bodily movement of the lever 62 as well as of its swinging movement, that the point of departure of the chain 72 from said segment remains substantially in the fixed line of draft coincident with the axis of the piston rod 69. The above described parts, including the standard 60, the link 64, the lever 62, the chain 72, the link 71, the piston rod 69, and the piston 68, that is, all of the parts which are permanently connected mechanically with the beam and the wheel, constitute a lifting mechanism for the plow. This lifting mechanism includes, as will be observed, some of the parts which are described above as included in the motive devices. It is obvious that the piston and the piston rod, while properly describable as parts of the motors or motive devices, are also properly describable as parts of the lifting mechanism, as they are permanently connected mechanically with the other parts thereof and serve as elements in the train of devices through which the power is transmitted to effect lifting. These lifting mechanisms are mechanically independent of each other, as they are not dependent, for the transmission of power from a common power source, upon a common mechanical device to which they must be connected in fixed predetermined relationship.

One of the principal objects of my invention is to provide means whereby the series of reciprocating motors can be caused to automatically operate in succession, beginning with the motor of the right forward plow, so that the plows will be lifted one after the other and the ends of the furrows terminated in approximately the same transverse line. In the construction shown suitable devices are provided for the supplying of power to the motors to actuate the several lifting mechanisms and lift the corresponding plows. In the drawing the pipe 74 which is carried by the engine, leads to the steam dome or other part of the steam chamber of the engine, and is provided with a two-way valve 75. This pipe is connected by means of a flexible hose or tube 76 with a pipe 77 mounted on the main frame of the plow. This pipe leads into the rear end of the cylinder 67 of the right forward plow. By turning the valve 75 in one position, steam can be admitted from the source of supply through the tube 76 and pipe 77 to the rear end of the cylinder 67 so as to act upon the rear side of the piston 68. Also by turning the valve 75 to a second position, the supply of steam can be cut off and the pipe 77 and tube 76 opened to exhaust.

In the front head of the cylinder 67 is mounted an exhaust pipe 78 which is always open to the atmosphere. A pipe 79 leads from the cylinder 67 at a point near the front end thereof, and this pipe extends to and communicates with the next adjacent cylinder 67 at the rear end thereof in the same manner as the pipe 77 communicates with the first cylinder 67. In the pipe 79 is introduced a throttle valve 80 of any preferred form. The second cylinder is provided with an exhaust pipe 78 in its front end in the same manner as the first cylinder, and a pipe 79 leads from the second cylinder to the third cylinder to connect them in the same manner in which the first and second cylinders are connected. In short, the entire series of cylinders, not all of which are shown in the drawings, are connected one with the other in this manner.

It will now be seen that when the valve 75 is turned to admit steam through the pipe 77, the pressure of the steam back of the piston 68 in the first cylinder will cause the latter to move to the front end of the cylinder, thus lifting the right, forward plow. As the piston 68 approaches the front end of the cylinder 67, it passes the port opening into the pipe 79 and thus allows the steam to pass through said pipe 79 to the rear end of the next adjacent cylinder 67 whereupon the piston in said second cylinder is actuated to lift the second plow, and at the end of this movement opens the steam pipe 79 leading from the second to the third cylinder. Thus the pistons in the several cylinders are actuated one after another to lift the plows in succession. By adjusting the throttle valves 80, one of which is interposed between each pair of cylinders, the movement of the pistons can be controlled, to a certain extent as will be readily understood, and consequently the successive movements of the pistons can be timed so that the plows will be lifted on approximately the same transverse line.

When the plows are raised from the ground, it will be understood that they are supported upon their ground wheels 59. If the plows are to be held in elevated position only during turning of the machine, the steam pressure will be relied upon to sustain them, but if on the contrary, the plows are to be drawn for some distance in elevated position, as when going to or from the field, they can be locked up by means of the bails 81, one of which is pivotally mounted upon the rear end of each cylinder 67 in position to be swung downward to engage a flange or collar 82 on the piston rod 69 when the piston is moved to the front end of its cylinder.

It will be observed that I have provided means whereby any one of the motors can be thrown out of operation independently of the others. It sometimes happens that, because of the heavy character of the plowing, the tractor does not have the power to operate all of the units, or that for some other reasons it is desired to use less than the full number of units. Under such conditions it is possible for the operator to hold one or more of the units on each side out of operative plowing positions. The means which I have provided for this purpose consist of the bails 81 which can be used to engage the lifting mechanisms to hold them in such positions that the plows are maintained elevated. When the lifting mechanisms are so held the pistons 68 are in their foremost positions, as indicated by dotted lines in the lower part of Fig. 6, and the steam can pass through the corresponding cylinders to act on the pistons in the succeeding cylinders. By providing lifting mechanisms for the respective plowing units which are entirely independent of each other mechanically, it is possible, as above stated, to lock one or more of them against movement and to leave the others entirely free for movement in the normal way. The inoperative mechanisms are entirely idle and no parts thereof are forced to move in any respect.

When, after turning at the end of the field, the plows are to be lowered, the valve 75 is set so as to open the pipe 77 to the atmosphere. This relieves the pressure behind the piston 68 and permits it to be moved rearward under the action of the weight of the plow connected to it. As the piston in this movement passes the port with which pipe 79 communicates, the latter is open to exhaust through the pipe 78. Thus shortly after the piston of the first cylinder is started on its rearward movement, the pressure back of the piston in the second cylinder is relieved, permitting it to move rearward and lower the second plow. In this manner the several plows are lowered one after the other in such a manner that they enter the ground approximately on the same transverse line. It will be understood that the valves 80 act to regulate the lowering movement of the plows as well as the lifting movement thereof.

In Fig. 5 I have shown a construction which differs somewhat from that shown in Fig. 4. Instead of providing the lever on the plow beam with the segment guide 62$^a$ for the chain, the lever 62' is provided with an extension 83 to which the chain 72 is directly attached. I find that if the lever 62' is made of suitable dimensions and is suitably shaped, its upper forward end to which the chain 72 is attached, remains in the line passing through the axis of the piston rod 69 when the lever is given its combined swinging and bodily upward movement by the actuation of the motor piston. I thus secure by simpler means substantially the same result as is secured by the construction shown in Fig. 4.

The operation of my improved plow, and the manner in which it is handled will be readily understood from the foregoing description. In hauling the plow to the field, the several individual plows are locked in their elevated positions in the manner described. On entering the field at the point where the plowing is to begin, the operator can turn the valve 75 to admit steam into the several lifting cylinders, thus relieving the tension upon the locking bails 81 so that they can be lifted to inoperative position. Then, upon opening the valve 75 to exhaust as the machine is started forward, the plows will be lowered in succession in the manner previously described. When the turning point is reached at the other side of the field, the valve 75 is turned to admit steam to the lifting cylinders whereupon they are actuated one after the other beginning with the front right cylinder to lift the plows in succession so that the furrows are terminated on the same transverse line. After turning, the valve 75 is again opened to exhaust to cause the lowering of the plows on the line where they had just been lifted.

If at any time it is desirable to back the plow, this can readily be done by simply backing the engine, the plow operator in the mean time being at the steering wheel 37 to control the front ground wheels 20. By swinging these wheels, the plow frame can readily be steered in the backing operation. Of the gang plows constructed or proposed heretofore, the only ones known to me which were capable of being backed by the tractor, were those in which the main frame was provided with devices for bodily lifting the individual plows off the ground. By pivoting the individual plows directly to a rigid gang structure, by supporting each individual plow upon a ground wheel and by providing a strut or pole between the engine and plow, I have produced a machine having the advantages of simplicity, lightness and cheapness, which at the same time is capable of being backed by the tractor and handled in practically the same manner as the prior constructions referred to which were heavier, more cumbersome and more expensive to build.

It will be understood further that the telescoping form of backing pole which I employ does not interfere in any way with the action of the draft chains, and the latter can have their lengths adjusted in relation to each other to shift the center line of the plow frame laterally relative to the center line of the tractor.

What I claim is:—

1. In a gang plow, the combination of a main frame, an obliquely arranged series of plows connected to the frame, and a series of motors adapted to operate automatically in succession to cause the successive lifting of the several plows, substantially as set forth.

2. In a gang plow, the combination of a main frame, an obliquely arranged series of plows connected to the main frame, a series of motors, one for each plow, and means for automatically causing the successive operation of the motors to successively lower the several plows from their upper inoperative positions to their lower operative positions, substantially as set forth.

3. In a gang plow, the combination of a main frame, an obliquely arranged series of plows connected to the main frame, a series of motors, one for each plow, and means for automatically causing the motors to operate successively, first to raise the several plows from their lower operative positions to their upper inoperative positions, and then to lower the several plows from their upper inoperative positions to their lower operative positions, substantially as set forth.

4. In a gang plow, the combination of a main frame, an obliquely arranged series of plows connected to the frame, a series of motors, one for each plow, and means for causing the motors to operate successively to successively lift the several plows from their lower operative positions to their upper inoperative positions, and means for regulating the intervals between the operations of the several motors, substantially as set forth.

5. In a gang plow, the combination of a main frame, an obliquely arranged series of plows connected to said frame, a series of lifting motors, one for each plow, manual means for controlling one of the motors, and means whereby each motor by its movement controls the movement of an adjacent motor, whereby the motors operate successively to lift the plows in succession, substantially as set forth.

6. In a gang plow, the combination of a main frame, an obliquely arranged series of plows connected to the frame, a series of motors, one for each plow, manually operable means for controlling one of the motors, and means whereby each motor by its movement controls the movement of an adjacent motor to cause it to lower its plow, the motors thus acting successively to lower the plows in succession, substantially as set forth.

7. In a gang plow, the combination of a main frame, an obliquely arranged series of plows connected to the main frame, a series of lifting motors, one for each plow, manually operable means for controlling one of the motors, means whereby each motor by its movement in the direction to lift its plow causes a similar movement of an adjacent motor, the motors thus acting successively to lift the plows in succession, and means whereby each motor by its movement in the direction to lower its plow causes a similar movement of an adjacent motor, the motors thus acting successively to lower the plows in succession, substantially as set forth.

8. In a gang plow, the combination of a main frame, an obliquely arranged series of plows connected to the main frame, a series of lifting motors, one for each plow, manually operable means for controlling one of the motors, means whereby each motor by its movement controls the movement of an adjacent motor, the motors thus acting successively to lift the plows in succession, and means for regulating the rate of movement of the several motors, substantially as set forth.

9. In a gang plow, the combination of a main frame, an obliquely arranged series of plows connected to the frame, a series of fluid pressure lifting motors, one for each plow, a source of motive fluid for the motors, manual means for controlling the supply of motive fluid, and means for automatically causing the admission of motive fluid to the motors in succession, whereby the plows are successively lifted, substantially as set forth.

10. In a gang plow, the combination of a main frame, an obliquely arranged series of plows connected to the frame, a series of fluid pressure lifting motors, one for each plow, a source of motive fluid for the motors, manually operable means for controlling the supply of motive fluid, means for automatically causing the admission of motive fluid to the motors in succession, whereby the plows are successively lifted, and means for automatically releasing the motive fluid from the motors in succession, whereby the plows are successively lowered, substantially as set forth.

11. In a gang plow, the combination of a main frame, an obliquely arranged series of plows connected to the main frame, a series of plow lifting mechanisms, each movable independently of the others, one lifting mechanism being provided for each plow with which it has a permanent power connection, and devices for supplying power to actuate the several lifting mechanisms and lift the corresponding plows, the power supplying device for one mechanism being manually controllable and each of the power supplying devices for the other mechanisms being controlled by the movement of the next adjacent power supplying device substantially as set forth.

12. In a gang plow, the combination of a main frame, an obliquely arranged series of plows connected to the main frame, a series of plow moving mechanisms, each movable independently of the others, one moving mechanism being provided for each plow with which it has a permanent power connection, and devices for actuating the several plow moving mechanisms to lower the corresponding plows, one plow moving mechanism being manually controllable and each of the other plow moving mechanisms being controlled by the movement of the actuating devices of the next adjacent plow moving mechanism, substantially as set forth.

13. In a gang plow, the combination of a main frame, an obliquely arranged series of plows connected to the main frame, a series of plow lifting mechanisms, each movable independently of the others, one lifting mechanism being provided for each plow with which it has a permanent power connection, devices for actuating the several lifting mechanisms to cause them to lift the corresponding plows and hold them in lifted positions, the actuating device for one mechanism being manually controllable, and each of the actuating devices for the other mechanisms being controlled by the movement of the actuating device of the next adjacent mechanism, and devices for releasing the several mechanisms to permit the plows to be lowered, the releasing devices for one mechanism being manually controllable, and each of the releasing devices for the other mechanisms being controlled by the movement of the releasing device of the next adjacent mechanism, substantially as set forth.

14. In a gang plow, the combination of a main frame, an obliquely arranged series of plows connected to the main frame, a series of plow lifting mechanisms, each movable independently of the others, one mechanism being provided for each plow, devices for actuating the several lifting mechanisms to cause them to lift the corresponding plows, the actuating device for one mechanism being manually controllable and each of the actuating devices for the other mechanisms being controlled by the movement of the next adjacent mechanism, and means for regulating the rate of movement of the several mechanisms, substantially as set forth.

15. In a gang plow, the combination of a main frame, an obliquely arranged series of plows connected to the main frame, a series of fluid pressure lifting motors, one for each plow, each motor comprising a cylinder and a piston therein, a motive fluid supply pipe for one of the motor cylinders, manual means for controlling the passage through said pipe, and a series of pipes connecting the several motor cylinders in series, the piston in each cylinder serving by its movement to control the passage leading to another cylinder, whereby the motors are caused to operate successively to lift the plows one after another, substantially as set forth.

16. In a gang plow, the combination of a main frame, an obliquely arranged series of plows connected to said frame, a series of fluid pressure lifting motors, one for each plow, each motor comprising a cylinder and a piston therein, a motive fluid supply pipe for one of the motor cylinders, manual means for controlling the passage through said pipe, a series of pipes connecting the several motor cylinders in series, and valves in said pipes for adjusting the capacity of the passages therethrough, the piston in each motor cylinder serving by its movement to control the passage leading to another cylinder, whereby the motors are caused to operate successively to lift the plows one after another, substantially as set forth.

17. In a gang plow, the combination of a main frame, an obliquely arranged series of plows connected to the main frame, an obliquely arranged series of motors mounted on the main frame, one motor being provided for each plow in longitudinal alinement therewith, each motor comprising a cylinder and a piston therein movable along lines extending longitudinally of the frame, connections between the several pistons and the corresponding plows whereby movements of the pistons will cause the plows to be lifted, a source of motive fluid for the motors, and means for causing the admission of the motive fluid to the motor cylinders in succession whereby the plows are successively lifted, substantially as set forth.

18. An automatic lift for gang plows having a fluid pressure piston and cylinder operatively connected to each plow and means controlling the cylinders, the means for each cylinder after the first being automatically controlled by the movement of the piston in the cylinder of the preceding plow.

19. In a gang plow, the combination of a draft frame, an oblique series of trailing plow units flexibly connected to the frame, a series of lifting mechanisms each mechanically independent of the others and respectively connected with the several units to lift them, devices for supplying power to normally actuate the several lifting mechanisms successively beginning with the one for the foremost plow, and locks for holding any one of the lifting mechanisms in position to maintain the corresponding unit elevated without interfering with others.

In testimony whereof I affix my signature, in presence of two witnesses.

JOHN B. BARTHOLOMEW.

Witnesses:
G. W. PERRY, Jr.,
J. M. CALDWELL.